United States Patent Office 3,384,624
Patented May 21, 1968

3,384,624
PREPOLYMER COMPOSITION
Herbert L. Heiss, New Martinsville, W. Va., assignor to Mobay Chemical Company, Pittsburgh, Pa., a corporation of Delaware
No Drawing. Filed Mar. 1, 1965, Ser. No. 436,275
9 Claims. (Cl. 260—77.5)

ABSTRACT OF THE DISCLOSURE

Monomeric tolylene diisocyanate is removed from a prepolymer composition prepared by reacting an excess of tolylene diisocyanate with an organic compound containing active hydrogen containing atoms as determined by the Zerewitinoff method by reacting the monomeric tolylene diisocyanate remaining in the prepolymer with a benzyl alcohol.

---

This invention relates to polyurethanes, particularly to a prepolymer useful in the preparation of polyurethanes, and more particularly to the stabilization of isocyanate-bearing prepolymer compositions.

Heretofore it has been known that organic diisocyanates may be reacted with polyhydric polyalkylene ethers to prepare NCO-terminated prepolymers which can subsequently be used in reactions with other compounds containing active hydrogen atoms, such as, for example, water, glycols, diamines, and amino alcohols to produce polyurethane plastics having either a porous or non-porous structure.

In carrying out the production of urethane polyisocyanates, generally the diisocyanate component is used in such an excess as to provide at least one mol of diisocyanate per mol equivalent of hydroxy group contained in the polyhydric polyalkylene ethers. However, due to side reactions leading to the formtaion of polymeric products, it has been impossible to produce urethane polyisocyanates which are free of unreacted monomeric diisocyanates. If, for example, a polyhydric alcohol is reacted with a stoichiometric amount of diisocyanate, a certain proportion of the diisocyanate remains unchanged in the reaction mixture. If the diisoycanate component is used in an amount greater than two mols of diisocyanate per hydroxl group in order to avoid the formation of side reactions and to shift the reaction toward the formation of desired urethane polyisocyanates, the urethane polyisocyanates thus obtained contain the excess diisocyanate as unreacted monomeric diisocyanate. An extremely important factor in the preparation of these prepolymer substances is the reuslting NCO content. It is desirable to obtain a prepolymer composition having NCO values as high as practical while minimizing the amount of free monomeric isocyanate present. Since the vapors from the monomeric isocyanate are extremely irritating to the respiratory system, skin, and the eyes of the user, extreme precaution must be taken in working with prepolymers containing unreacted monomeric isocyanates. Several attempts have been made to reduce and control the toxicity of the prepolymer compositions. However, these procedures have found somewhat limited success. In most instances, these treatments resulted in the loss of available NCO groups per unit of weight, which is undesirable.

Since these prepolymers have been frequently used in the manufacture of many consumer items, such as coatings, castings, paints, and lacquers, and because of their large-scale consumer usage, there has been a definite need for an improved process which would minimize the unreacted isocyanate monomer content of these substances.

It is, therefore, a primary object of this invention to provide improved NCO-terminated prepolymers. Another object of this invention is to provide a prepolymer composition which is substantially free of unreacted monomeric tolylene diisocyanates. Still another object of this invention is to provide a method for effectively reducing the unreacted monomeric tolylene diisocyanate in NCO-terminated prepolymers. Still another object of this invention is to produce a prepolymer having reduced toxicity. A still further object of this invention is to provide a process for the production of a prepolymer which is useful in the preparation of polyurethane plastics. A still further object of this invention is to provide stabilized NCO-terminated prepolymer compositions.

In accordance with this invention, generally speaking, the foregoing objects and others are accomplished by forming liquid NCO-terminated prepolymers substantially free of unreacted monomeric tolylene diisocyanates by first reacting an excess of tolylene diisocyanate with an active hydrogen-containing compound to form an NCO-terminated prepolymer composition and thereafter contacting the prepolymer composition with a compound having the general formula

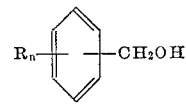

wherein R repersents hydrogen, alkyl, aryl, arylalkyl, alkaryl, alkoxy, and aryloxy groups and fused rings, having from 1 to 12 carbon atoms, and $n$ is an integer of from 1 to 5. Alkyl groups such as methyl, ethyl, propyl, butyl, hexyl, octyl, and the like; aryl groups such as phenyl and naphthyl; arylalkyl groups such as phenmethyl, phenethyl, phenpropyl, and phenbutyl; alkaryl groups such as cumenyl, mesityl, tolyl, and xylyl; and alkoxy groups such as methoxy, ethoxy, propoxy, butoxy, and the like, may be employed. Examples of fused rings are pentalene, indene, napthalene, azulene, heptalene, biphenylene, and the like. It has been found that when an excess of an isocyanate is reacted with an active hydrogen-bearing substance, the resulting prepolymer reaction product contains a substantial amount of free monomeric tolylene isocyanate. The process of this invention minimizes the free monomeric isocyanate content while at the same time maintains to a substantial degree the NCO content of the reaction product.

The compound having the general formula illustrated above reacts preferentially with the free monomeric tolylene isocyanate, thus reducing the free monomeric isocyanate to a level substantially below that obtained under the same conditions without the use of this compound. Surprisingly, it has been found that the hydroxyl group of the low-molecular-weight compound illustrated above reacts preferentially with the No. 4 NCO groups of the unreacted monomeric tolylene diisocyanate in high efficiency, thus effectively reducing the monomeric isocyanate content. It was also found that phenols were undesirable as an agent for reducing the unreacted monomeric isocyanate present in the prepolymers due to the fact that they were non-selective with respect to the NCO groups and had the effect of lowering the overall NCO value of the prepolymer. For practical reasons, it is desirous to produce prepolymers which, in their final form, contain less than about one percent of free isocyanate monomer. In effecting this reduction, it is desirable to retain the highest possible total NCO content.

Any suitable compound having the general formula illustrated above may be used in the process of this invention to react with the unreacted monomeric tolylene diisocyanate remaining in admixture with the NCO-terminated prepolymer. Examples of suitable compounds are benzyl alcohol and substituted benzyl alcohol, wherein the substituted groups may be organo groups having from 1 to 12 carbon atoms. Compounds other than benzyl alcohol which may be employed are trimethyl benzyl alcohol, o-methyl benzyl alcohol, p-methyl benzyl alcohol, m-methyl benzyl alcohol, cuminol, o-ethyl benzyl alcohol, p-methoxy benzyl alcohol, 2,4-dimethoxy benzyl alcohol, p-ethoxy benzyl alcohol, and the like.

At least 0.8 equivalent per equivalent of unreacted monomeric diisocyanate should be used. Preferably, the alcohol should be used in an amount stoichiometrically equivalent to the monomeric tolylene diisocyanate present. In order to determine the amount of alcohol to be added, the amount of unreacted tolylene diisocyanate monomer present in the prepolymer must first be determined. Any suitable analytical procedure for determining the free monomeric isocyanate content can be used such as that disclosed in E. I. du Pont de Nemours and Company Elastomer Chemicals Department Paint Bulletin PB–5, entitled "The Determination of Isocyanate Groups and Free Toluene Diisocyanate in Urethane Polymers," by W. S. Remington.

In carrying out the reaction of the benzyl alcohol or derivatives thereof with the prepolymer composition containing unreacted monomeric isocyanate, it is generally not necessary to employ elevated temperatures. If desired, the benzyl alcohol or derivatives thereof may be reacted with the prepolymer composition at temperatures up to where decomposition or side reactions will occur in the prepolymers, preferably at temperatures between about 20° C. and 120° C. and more preferably between about 50° C. and 70° C.

The reaction time, though not critical, is an inverse function of the temperature: the higher the reaction temperature, the shorter the reaction time. However, it is preferred that the reaction time be sufficient for the benzyl alcohol or derivatives thereof to react with the unreacted monomeric isocyanate present in the prepolymer composition.

The final NCO-terminated prepolymer composition from which the monomeric tolylene diisocyanate has been substantially reduced by reaction with the benzyl alcohol and substituted benzyl alcohol can then be further reacted in conventional fashion with organic diamines or other chain extenders such as amino alcohols, glycols, and the like to produce polyurethane castings. Reduction in the unreacted tolylene diisocyanate not only increases the casting time and uniformity of the reaction product of the prepolymers with diamines but, surprisingly, increases the hardness of the final casting. Any suitable diamine may be used as a chain-extending agent to produce the desired polyurethane products, such as, for example, tolylene diamine, 4,4'-diamino-diphenyl methane, phenyl diamine, 1,5-naphthylene diamine, ethylene diamine, propylene diamine, 4,4'-methylene-bis(2-chloroaniline), dichlorobenzedine, 3,3'-dichloro-4,4'-diphenyl diamine, 2,6-diamino pyridine hydrazine, carbodihydrazine, and the like. Any suitable glycol such as butanediol, propylene glycol, phenylene di-beta-hydroxyethylether, hexanediol, and like may be used.

In the formation of the prepolymers, the lower the ratio of NCO to active hydrogen, the lower the total NCO content of the prepolymer and the lower the free monomer content. Although higher and lower NCO-to-active hydrogen values are operable in the preparation of the prepolymers of this invention, it is preferred that the ratio of NCO to active hydrogen be in the range from about 1.3–2:1 and more preferably in the range of from about 1.6–1.8:1. This is particularly true since values of free monomer of less than one percent are obtained when an alcohol is used in reducing the monomeric isocyanate content. At the same time, total NCO values useful for practical applications are obtained. If the NCO-to-active-hydrogen is adjusted to any given total NCO value without the use of alcohol, the free monomer content is greater than that obtained when an alcohol is used in preparations resulting in the same total NCO value. Stated in another way, the practice of this invention results in a higher NCO value for any given free monomer content than that obtained by simple adjustment of NCO to active hydrogen ratio in the ordinary system.

Active hydrogen-bearing substances which may be used in preparing the prepolymer used in the process of this invention are any suitable organic compounds containing at least two active hydrogen-bearing atoms as determined by the Zerewitinoff method. These active hydrogen atoms are reactive with NCO groups and may be used in the preparation of prepolymers or NCO-terminated prepolymers in accordance with this invention. These include both monomeric and polymeric compositions.

Any suitable monomeric compound having at least two active hydrogen-bearing groups per molecule may be used, such as polyhydric alcohols, including, for example, ethylene glycol, propylene glycol, 1,4-butanediol, neopentyl glycol, 1,3-butanediol, 1,5-pentanediol and the isomers thereof, 1,6-hexanediol and the isomers thereof, xylylene glycol, diethylene glycol, dipropylene glycol, thiodiglycol, p-phenylene-di-beta-hydroxy-ethyl ether, trimethylol propane, glycerol, sorbitol, tris-(hydroxy-ethoxy) benzene, and the like; polycarboxylic acids such as, for example, those mentioned hereinafter with relation to the preparation of hydroxyl polyesters.

Any suitable polymeric organic compound containing at least two active hydrogen atoms in the molecule, which active hydrogen atoms are reactive with NCO groups, may be used in the process of this invention, such as, for example, hydroxyl polyesters, polyesteramides, polyhydric polyalkylene ethers, polyhydric polythioethers, polyhydric polyacetals, and the like.

Any suitable hydroxyl polyester may be used, such as, for example, the reaction product of a polycarboxylic acid and a polyhydric alcohol. Any suitable polycarboxylic acid may be used in the preparation of polyesters, such as, for example, adipic acid, succinic acid, suberic acid, sebacic acid, oxalic acid, methyladipic acid, glutaric acid, pimelic acid, azelaic acid, phthalic acid, terephthalic acid, isophthalic acid, thiodiglycollic acid, thiodipropionic acid, maleic acid, fumaric acid, citraconic acid, itaconic acid, trimellitic acid, pyromellitic acid, 1,3,5-benzene tricarboxylic acid, and the like. Any suitable polyhydric alcohol may be used in the reaction with the polycarboxylic acid to form a polyester, such as, for example, ethylene glycol, propylene glycol, hexanediol, bis-(hydroxy methyl cyclohexane), 1,4-butanediol, diethylene glycol, polyethylene glycol, 2,2-dimethyl propylene glycol, xylylene glycol, neopentyl glycol, trimethylol propane, glycerine, castor oil, and the like.

Any suitable polyhydric polyalkylene ether may be used, such as, for example, the condensation product of an alkylene oxide with a compound containing active hydrogen atoms such as, for example, water, ethylene glycol, propylene glycol, butylene glycol, anylene glycol, trimethylol propane, 1,2,6-hexanetriol, hydroquinone, pyrocatechol, pyrogallol, and the like. Any suitable alkylene oxide condensate may also be used, such as, for example, the condensates of ethylene oxide, propylene oxide, butylene oxide, amylene oxide, styrene oxide and mixtures thereof. The polyalkylene ethers prepared from tetrahydrofuran may be used, such as polytetramethylene ether glycols; the polyhydric polyalkylene ethers may be prepared by any known process such as, for example, the process described by Wurtz in 1859 and in the Encyclopedia of Chemical Technology, vol. 7, pages 257–262, published by Interscience Publishers in 1951, or in U.S. Patent 1,922,459.

Any suitable polyhydric polythioether may be used, such as, for example, the reaction product of one of the aforementioned alkylene oxides used in the preparation of the polyhydric polyalkylene ether with a polyhydric thioether such as, for example, thiodiglycol, 3,3'-dihydroxy propyl sulfide, 4,4'-dihydroxy butyl sulfide, 1,4-(beta-hydroxy ethyl) phenylene dithioether, and the like.

Any suitable polyesteramide may be used, such as, for example, the reaction product of poly- or diamine and/or amino alcohol with a carboxylic acid. Any suitable amine, such as, for example, ethylene diamine, propylene diamine, ethanol amine, 2,4-toluene diamine, p-phenyldiamine, and the like, may be used in the preparation of the polyesteramide. Any suitable polycarboxylic acid may be used, such as, for example, those more particularly disclosed above for the preparation of hydroxyl polyesters. Further, a mixture of a glycol and an amino alcohol or polyamine may be used. Any of the glycols mentioned for the preparation of polyesters may be used.

Any suitable polyacetal may be used, such as, for example, the reaction product of an aldehyde and a polyhydric alcohol. Any suitable aldehyde may be used in the preparation of the polyacetal, such as, for example, formaldehyde, paraldehyde, butyraldehyde, and the like. Any of the polyhydric alcohols mentioned above in the preparation of the hydroxyl polyesters may be used. Any of the polyacetals set forth in U.S. Patent 2,961,428 may be used.

The selection of a preferred active hydrogen-bearing compound for the preparation of the prepolymer in the first stage of the present process depends largely upon the intended use, for example, for coatings, elastomers, plastics, and the like.

Isocyanates which may be used to make the prepolymer are, for example, organic polyisocyanates, preferably aromatic isocyanates, such as, for example, tolylene polyisocyanates and more preferably 2,4-tolylene diisocyanate.

In the preparation of the NCO-terminated prepolymers, the isocyanate is used in an amount such that the reaction product has a sufficiently high NCO content and urethane density. However, to achieve both high NCO content and urethane density, an NCO/OH ratio of at least 1.3 and preferably 1.6/1 should be used. This results in a prepolymer which contains unreacted monomeric tolylene diisocyante. Any amount of tolylene diisocyanate equal to or greater than about 1.6 equivalents per equivalents of polyether glycol results in such a mixture. Equivalent ratios of tolylene diisocyanate to polyethers as high as 12 to 1 have been used in preparing such prepolymers. However, it is preferred that the amount of tolylene diisocyanate per equivalent of polyether be from about 1.3 to about 2.2 equivalents.

It was found that the compounds formed as a result of the reaction between the free monomeric tolylene diisocyanate and benzyl alcohol or substituted benzyl alcohols were unstable when subjected to elevated temperatures such as those encountered in the chromatographic analysis techniques. Due to the instability of these compounds, the conventional analytical techniques for determining the free monomeric tolylene diisocyanate were unsatisfactory. The presence of free monomeric tolylene diisocyanate remaining after the addition of benzyl alcohol or substituted benzyl alcohols is determined by heating the prepolymer solution to a temperature of from 50° C. to about 70° C. and determine if isocyanate is present in the vapor by the "sniff test." It has been found that isocyanate values above about 0.2 precent are detectable in the vapor by the "sniff test."

In a preferred embodiment, a polyalkylene ether glycol is reacted with tolylene diisocyanate in quantities such that the NCO/OH ratio is in the range of about 1.8/1. Prepolymers prepared as such have an overall NCO content of about 11 percent and an unreacted monomeric tolylene diisocyanate content of about 2.0 percent. To the prepolymer mixture benzyl alcohol was added in the ratio of one equivalent per equivalent of the unreacted monomeric tolylene diisocyanate. After heating to a temperature of about 70° C. for at least one hour, no free monomeric tolylene diisocyanate was detected in the vapor.

For purposes of illustration and simplicity, the process of this invention will be described herein in relation to prepolymers made by using tolylene diisocyanate.

The following examples will further illustrate the particular embodiments of this invention. It will be understood that these examples are given for illustrative purposes only and are not meant to limit the invention to the particulars defined therein. Parts are by weight unless otherwise specified.

EXAMPLE 1

Preparation of NCO-terminated prepolymer

About 250 parts of a polypropylene ether glycol having a molecular weight of about 1000 were added to about 90.5 parts of 2,4-tolylene diisocyanate at room temperature. The reaction mixture was heated to about 75° C. and permitted to react to completion. The prepolymer thus prepared had an NCO content of about 7.1 percent and an unreacted monomeric tolylene diisocyanate content of about 4.6 percent.

EXAMPLE 2

To about 100 parts of the prepolymer prepared in Example 1, about 3.0 parts of benzyl alcohol were added and heated to a temperature of 70° C. for approximately one hour. The prepolymer composition exhibited an NCO content of about 6.9 percent. After heating the prepolymer composition to a temperature of about 50° C. no unreacted monomeric tolylene diisocyanate was detected in the vapor.

EXAMPLE 3

To about 100 parts of the prepolymer prepared in Example 1, about 3.3 parts of benzyl alcohol were added and heated to a temperature of about 70° C. for approximately two hours. The prepolymer composition exhibited an NCO content of about 6.6 percent. After heating the prepolymer composition to a temperature of about 65° C., no unreacted monomeric tolylene diisocyanate was detected in the vapor.

EXAMPLE 4

To about 100 parts of the prepolymer prepared in Example 1 about 3.23 parts of ortho-tolubenzyl alcohol were added and heated to a temperature of 70° C. for approximately three hours. The product thus prepared exhibited an NCO content of about 6.9 percent. No unreacted monomeric tolylene diisocyanate was detected.

EXAMPLE 5

To about 100 parts of the prepolymer prepared in Example 1 were added about 3.65 parts of methoxy benzyl alcohol. The reaction mixture was heated to a temperature of about 40° C. and permitted to react for a period of about 5 hours. The resulting product had an NCO content of about 6.7 percent and no unreacted monomeric tolylene diisocyanate was detected in the vapor when heated to 50° C.

It is obvious from the above examples that benzyl alcohols and substituted benzyl alcohols effectively reduce the monomeric tolylene diisocyanate content in the NCO-terminated prepolymers. Only an equivalent amount of alcohol is necessary to react with the free monomeric tolylene diisocyanate and when greater amounts are employed, they will reduce the total NCO content of the prepolymer.

It is of course, to be understood that the examples are for the purpose of illustration and that the invention is not limited to the specific embodiments set forth in the examples. Any of the polyhydric polyalkylene ethers, glycols, and isomeric ratios of tolylene diisocyanate and aromatic alcohols set forth in the specification may be substituted in the working examples for those specifically used therein.

It has also been discovered that prepolymers containing unreacted monomeric isocyanates are readily stabilized against further polymerization or decomposition on storage by the addition of such prepolymer compositions of benzyl alcohol or derivatives thereof. Benzyl alcohol and substituted benzyl alcohols are soluble in such prepolymer compositions and, therefore, will not affect or inhibit the reactivity of the prepolymer in the subsequent formation of polyurethanes. As a consequence, the prepolymer compositions can be stabilized for an indefinite period of time during storage. In addition, the irritating vapors heretofore associated with prepolymers have been removed.

To stabilize the prepolymer compositions containing unreacted monomeric isocyanates, it is necessary to add only an amount of benzyl alcohol or substituted benzyl alcohols equivalent to the unreacted monomeric isocyanates in the composition.

Although the invention has been described in considerable detail in the foregoing, it is to be understood that such detail is solely for the purpose of illustration and that many variations can be made by those skilled in the art without departing from the spirit and scope of the invention, except as set forth in the claims.

What is claimed is:

1. A process for reducing unreacted monomeric tolylene diisocyanate in an NCO-terminated liquid prepolymer composition prepared from the reaction of excess tolylene diisocyanate with an organic compound containing at least 2 active hydrogen-containing atoms as determined by the Zerewitinoff method which comprises reacting a compound having the formula

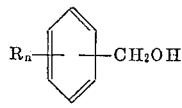

wherein R is a member selected from the group consisting of hydrogen, alkyl, alkaryl, arylalkyl, alkoxy and aryloxy groups and fused rings, having from 1 to 12 carbon atoms, and $n$ is an integer of from 1 to 5 with unreacted monomeric tolylene diisocyanate in said prepolymer composition.

2. The process of claim 1 wherein the compound is reacted with the unreacted monomeric tolylene diisocyanate at a temperature of from 20° to 120° C.

3. The process of claim 1 wherein the tolylene diisocyanate is 2,4-tolylene diisocyanate.

4. The process of claim 1 wherein the compound is benzyl alcohol.

5. The process of claim 1 wherein the active hydrogen-containing compound is a polyhydric polyalkylene ether.

6. The process of claim 1 wherein R is a methyl group and $n$ is from 1 to 3.

7. The process of claim 1 wherein the compound is reacted in an amount at least equivalent to the unreacted monomeric tolylene diisocyanate.

8. The process of claim 1 wherein said organic compound containing at least two active hydrogen containing atoms is a polyhydric alcohol.

9. A process for reducing the unreacted monomeric tolylene diisocyanate content in an NCO-terminated liquid prepolymer composition prepared from the reaction of tolylene diisocyanate with a polyhydric polyalkylene ether which comprises reacting a compound having the formula

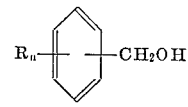

wherein R is a member selected from the group consisting of hydrogen, alkyl, alkaryl, arylalkyl, alkoxy, and aryloxy groups and fused rings, having from 1 to 12 carbons atoms, and $n$ is an integer of from 1 to 5 with the unreacted monomeric tolylene diisocyanate in said prepolymer composition in an amount substantially equivalent to the unreacted monomeric tolylene diisocyanate.

References Cited

UNITED STATES PATENTS

| 3,242,230 | 3/1966 | Habib | 260—77.5 |
| 3,294,713 | 12/1966 | Hudson et al. | 260—75 |

FOREIGN PATENTS 767,017  1/1957  Great Britain.

DONALD E. CZAJA, *Primary Examiner.*

M. I. MARQUIS, *Assistant Examiner.*